United States Patent Office 3,468,638
Patented Sept. 23, 1969

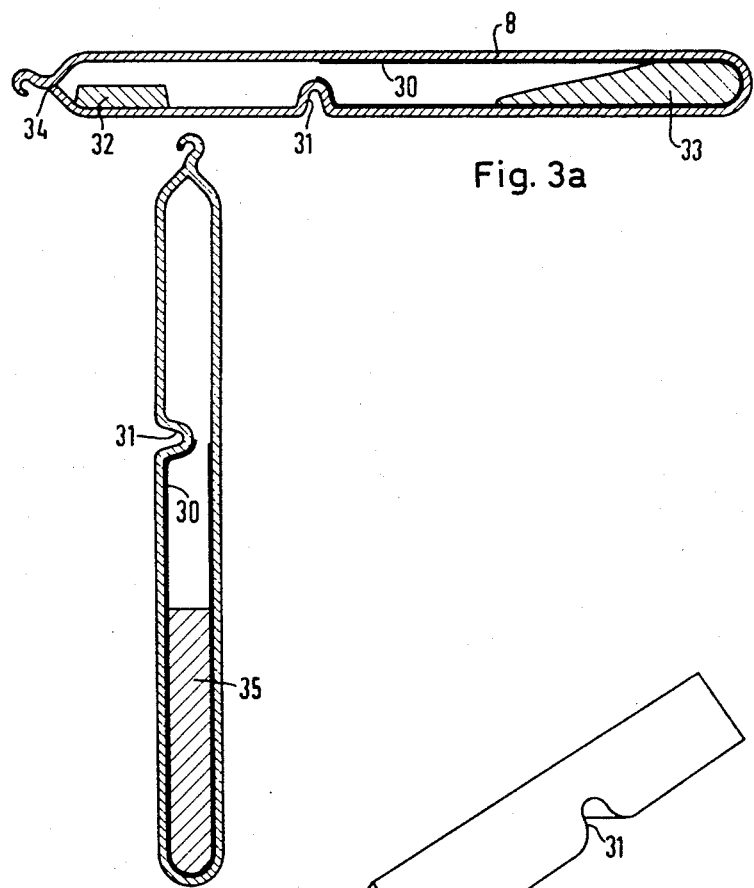

3,468,638
METHOD OF PRODUCING CRYSTALLINE RODS FROM SEMICONDUCTOR COMPOUNDS
Bruno Reiss, Erlangen, and Theodor Renner, Nuremberg, Germany, assignors to Siemens Aktiengesellschaft, Erlangen, Germany, a corporation of Germany
Filed Sept. 27, 1966, Ser. No. 582,412
Claims priority, application Germany, Sept. 29, 1965, S 99,741
Int. Cl. B01j 17/02, 17/18; C01b 25/08
U.S. Cl. 23—315                          2 Claims

ABSTRACT OF THE DISCLOSURE

Described is a method of producing crystalline rods of semiconductor compounds. These rods are produced from a relatively more and a relatively less volatile component. The compound is first synthesized as a melt through the synthesis reaction of the more volatile component with the less volatile component within a tubular crucible. This tubular crucible is rotatable around an axis running perpendicular to the longitudinal axis. The synthesis is carried out with the tubular crucible in approximately horizontal position. An indentation provided in the tubular crucible separates the original material of the more volatile component from the less volatile component. After the melt has been prepared, the crucible is turned to the vertical position so that freezing of the melt may occur. Also described is apparatus for carrying out said process.

---

Figure 1:
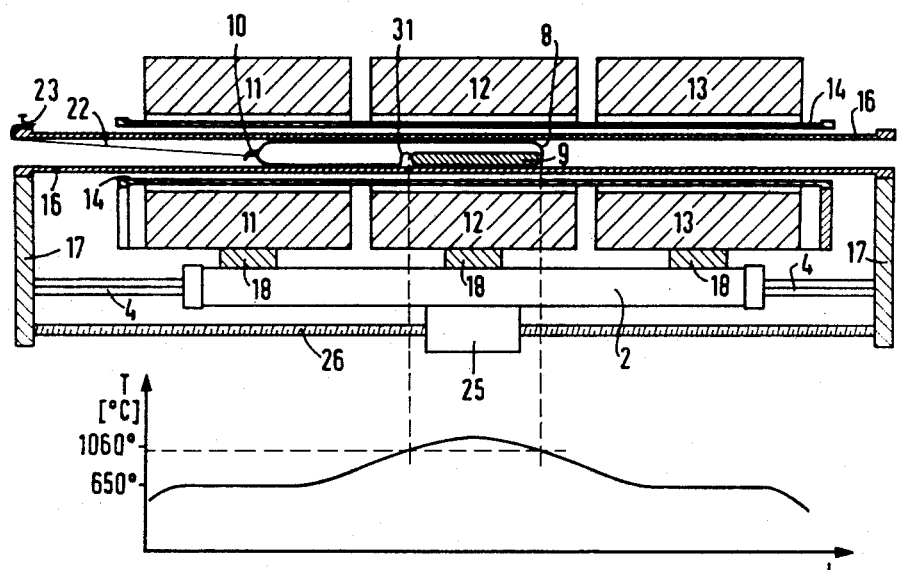

Generally, when producing filters of selective permeability or reflectability of electromagnetic waves, of semiconductor material, it is preferable to start from semiconductor rods having a cross section corresponding to the desired filter shape. These rods may be crystallized in a vertically positioned tubular crucible which simultaneously serves as a container and as a casting form. Compared to horizontally solidified bars, which usually have a relatively irregular cross section, not only is material saved but also the operational expenditure is considerably reduced by the vertical solidification. Thus, for example, when producing round filters, one can eliminate the cylindrical grinding of the bars, prior to their being sawed into discs, or the cutting out of filter discs from small plates, sectioned off from the bar. On the other hand, the small filter discs, produced by slicing round rods, need only be ground and polished. In the same way, filters of other shapes, for example triangular or hexagonal may easily be produced from rods with corresponding cross sections.

Still, the production of such rods from semiconductor compounds of which at least one component has vapor pressure considerably above the melt, as for example, InP, GaAs, InAs, $InAs_xP_{1-x}$ ($x=0$ to 1) and the like, was not readily possible until now. For example, round rods of these compounds could be obtained by freezing the already synthesized semiconductor melt in a vertically positioned cylindrical crucible. However synthesis is difficult even in a vertically positioned crucible, due to the small surface of the melt, e.g. the less volatile component available for reaction. Thus, during the production of GaAs rods for instance, a GaAs layer occurs at the surface of a gallium melt. This prevents a speedy and complete reaction down to the crucible floor. Due to the vertical position intimate mixing of the melt by convection is prevented as a result of shape of the narrow and deep crucible. When using a two-temperature method, i.e. regulating the arsenic pressure from solid phase by exact regulation of the temperature, complete reaction of the elements is obtained only after very prolonged reaction periods. Furthermore, it is impossible to maintain the arsenic equilibrium pressure above the melt by an exactly equal arsenic excess in a vertically positioned crucible. The pressure increase occurring with incomplete reaction may lead to an explosion of the reaction ampulla.

It is an object of the invention to remove these difficulties and to provide a device which would make it possible to carry out the synthesis of the semiconductor material and the subsequent crystallization of semiconductor rods in a process which is particularly suited for mass production.

The invention relates to a method of producing crystalline rods of semiconductor compounds which are composed of relatively more and relatively less volatile components. A tubular crucible, having a hollow space, fitted to the desired rod shape, serves as a casting form. According to this invention, the components are reacted to form a semiconductor melt in approximately horizontally positioned tubular crucible. The crucible is then vertically turned whence the melt is subjected to normal freezing, particularly solidifying from the bottom up.

Synthesizing the semiconductor material in a horizontal position of the tubular crucible results in the melt having a relatively large surface and a relatively shallow depth. For this reason, reaction of the components ensues producing the desired semiconductor compound from the melt, without a pressure increase of the more volatile component which would be dangerous to the apparatus. Because of the favorable shape of the reaction vessel, due to its horizontal position, a very thorough mixing of the melt by convection is all the more possible. A crucible may be used for this purpose which at approximately one half of its length has an indentation such that during synthesis of the semiconductor compound, the one half of the crucible becomes a boat for the melt.

After the synthesis has been completed, crystallization takes place in a crucible which is rotated 90° around an axis, perpendicular to the longitudinal axis. Thus the crucible serves both as a container for the melt and as a form for the crystalline product.

It is often preferable after the crystallization has been completed, to rotate the tubular crucible back to the horizontal position. In this manner, the more volatile component which is generally used in excess, may be simply removed, e.g. be poured off. This mode of operation is especially favorable, if the aforementioned component is self-igniting and/or toxic, as for example phosphorus during InP production, or mercury during HgTe production.

With the aid of the invented method, depending on the cross sectional shape of the crucible form, rods may be produced having circular, triangular or hexagonal cross sections. Using an appropriately shaped crucible, rods may also be produced having along their length recesses or indentations. The rods may also be conical. Using a tubular crucible with a fitting core, one can also produce crystalline hollow rods. The latter may, subsequently, be filled with another material, which acts differently to light for example.

If the rods are to be further processed into filters, they need only be sawed into small discs and then ground and polished. Depending on the type of semiconductor compound of which the rods produced according to the invention are comprised, filters are obtained which are permeable to light rays in the wavelength regions peculiar to these compounds, especially in infra-red waves.

Since the invention makes obtainment of rods with smooth surfaces feasible, it is also possible to produce prisms, particularly for infra-red light, by a direct synthesis from the elements and a subsequent crystallization. The prisms may be, e.g. triangular or round.

Figure 2:
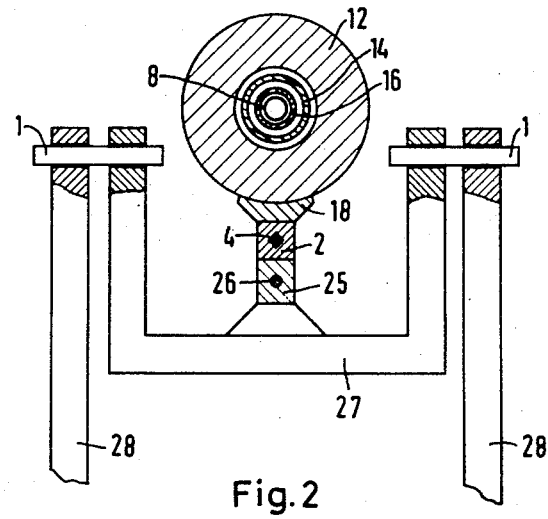

The invention will be described in greater detail with respect to a schematic drawing of embodiment examples in which:

FIG. 1 shows a furnace arrangement with tubular crucible and pertinent temperature distribution, FIG. 2 is a section, perpendicular to the longitudinal axis of the furnace arrangement, according to FIG. 1, FIGS. 3a and b are an example of a tubular crucible, in a horizontal and in a vertical position, respectively, and FIG. 4 is a tubular crucible with a triangular cross section.

In the interest of simplicity and without limiting the generalities, the invented method and the pertinent device will be disclosed with particular reference to indiumphosphide (InP) production which is an illustration of materials producible hereby.

The arrangement shown in FIG. 1 is rotatably positioned around the horizontal axis 1 of FIG. 2. Equal parts are given the same reference numerals in FIG. 1 and FIG. 2.

FIG. 1 shows a schematic illustration of a furnace arrangement with corresponding temperature distribution. In this device, the furnace 11 serves as a vaporizer of the more volatile component of the semiconductor compound which is to be produced, for example phosphorus in InP production. The center furnace 12 is provided as a melting furnace and furnace 13, at lower temperature, for subjecting the melt to freezing after the installation has been rotated 90° around the axis 1. A non-flammable (tinderproof) pipe 14 extends through all three furnaces, protecting the furnace in the event the crucible 8 initially leaks. The latter is movable within the carrier tube 16 and contains the melt 9 of indium, and after reaction indiumphosphide. As shown in the drawing, the crucible may have a circular cross section but also a triangular or another cross section, according to use to which the semiconductor rod being produced is to be put. The carrier tube may be made of ceramic. The crucible 8 is fastened to clamp 23 by a fire-resistant wire 22, attached to one end 10, so that the crucible cannot fall out from the tube 16, during the turning. The furnaces 11 to 13 are affixed to the furnace carriage 2. The latter may be moved along the square rail 4 with the drive 25, relative to the spindle 26. During the movement of the furnace carriage 2 on rail 4, the furnaces are moved relative to the crucible 8. The square rail 4, the carrier tube 16 and the drive spindle 26, are rigidly connected with the holders 17. By moving the furnace carriage 2, temperature zones may be pulled through the crucible contents and, particularly after the crucible has been lowered, the melt may be subjected to freezing. Suitable pulling speeds are, for example, 0.2 to 2 mm. per min. The temperature of the three furnaces may be regulated in a known manner through thermocouples. The supply lines for heating the furnace are not shown in the drawing.

The lower half of FIG. 1 shows the temperature profile of the three furnaces. The temperature T (in ° C.) is graphically illustrated in the ordinate as a function of the furnace length L. The illustrated profile applies to the InP production. When using the device for other compounds having at least one more volatile component, the profile may be adjusted to these systems in a simple manner, by regulating the furnace temperatures.

FIG. 2 shows a section perpendicular to the longitudinal axis of the furnace arrangement, according to FIG. 1. The carrier 27 may be rigidly connected with the spindle drive 25. Alternatively, the carrier 27 may also be screwed or welded, etc. With the holders 17 and the spindle 26. The latter method is preferable when it is vital that the crucible not be jarred. The former way may be employed if, in the interest of a good mixing-through, the crucible contents are to be jarred. The furnace position is supported by the carrier 27 in the stator 28, rotatable around axis 1.

FIGS. 3a and b show, as an example, a tubular crucible with circular cross section. In the position according to FIG. 3a, the crucible is suitable for synthesis. In the position according to FIG. 3b, the crucible is suitable for the crystallization of the semiconductor material. The crucible which simultaneously serves as a pressure and melting vessel, may consist of quartz and is preferably, produced with an inside diameter equal to the diameter of the semiconductor rods to be produced.

It is often preferable to carbonize portion 30 of the crucible 8 which is in contact with the semiconductor compound to be produced. This eliminates sticking of the semiconductor material to the crucible wall. The sticking may lead to the formation of tears in the semiconductor rod as well as to the destruction of the crucible.

An indentation 31, at the rim of the carbonized region 30, makes it possible to use this portion of the crucible, when in horizontal position, as the melt boat. The depth of the indentation 31 and the length of the boat may be chosen according to the length of the melting zone of the center furnace 12, as well as according to the weighed sample of the original semiconductor materials. For example, to produce a round semiconductor rod, approximately 9 cm. long, an indentation 31 up to at least half of the crucible cross section and a boat length of about 18 cm. can be used.

FIG. 4 shows an embodiment of a crucible with a triangular cross section. This crucible, too, may have an indentation 31.

The longitudinal section of a charged tubular crucible, drawn in FIG. 3a, contains at 32 the more volatile component of the semiconductor compound to be produced, for example phosphorus, and contains at 33 the less volatile component of the compound, for example indium. Synthesis of the semiconductor material is carried out at a temperature which is slightly above the melting point of the compound. In the case of InP this is approximately 1060° C. According to FIG. 1, this temperature prevails in the center furnace 12. The operational temperature for furnaces 11 and 13 is so chosen as to prevent a condensation of the more volatile components at a prescribed synthesis pressure, for example in case of phosphorus, approximately 650° C.

The following example will describe the method according to the invention:

In the production of InP rods, the specified amount of indium (33 in FIG. 3a) is inserted into the tubular crucible, and is melted under vacuum, while the crucible is in an inclined position, and heated. After an addition of phosphorus and a renewed weak heating, the crucible is sealed with a high vacuum, as shown at 34 of FIG. 3a. The aforementioned indentation (31) of the crucible, may be produced, among other things, with an oxyhydrogen flame.

After the crucible is suspended in the furnaces (FIG. 1), the furnace carriage 2 is placed in a horizontal position, or one which inclines slightly to the right, by approximately ½ to 1°. The three furnaces may be heated simultaneously. To avoid an uncontrolled pressure rise in the crucible, it is preferable, however, to let the temperature of the two furnaces 11 and 13 exceed 400° C. only after the melting temperature of the semiconductor compound to be produced has been reached in the center furnace 12.

Following a reaction time which is sufficient for adjusting the melting balance (in InP approximately ½ hour after reaching the desired temperatures, as shown in the temperature curve of FIG. 1) the apparatus is rotated into a vertical position. This position is illustrated in FIG. 3b for a crucible with circular cross section. In the vertically positioned crucible, the melt 35 is solidified through a vertical movement of the furnace, especially furnace 13, by means of the furnace carriage and is subjected to gradual freezing from the bottom upward. In the production of InP rods, suitable pulling velocities lie in the order of magnitude of 0.2 to 0.3 mm. per min.

After the semiconductor melt 35 has been crystallized, the apparatus may be returned to the horizontal position after the furnace current has been disconnected. In this manner it is possible to remove without difficulty a possibly excessive portion of the more volatile component, for example phosphorus, from the surface of the semiconductor crystal.

For recovering the semiconductor crystal rods, the wall of the crucible may be cut for example at two facing longitudinal sides and the crucible may then be broken by an appropriate wedge.

We claim:
1. Method of producing crystalline rods of semiconductor compounds, which are composed of relatively more and relatively less volatile components, whereby the compound is first synthesized as a melt, through a synthesis reaction of the vapor of the more volatile component with the less volatile component within a tubular crucible which is rotatable around an axis running perpendicular to the longitudinal axis, carrying out the synthesis in an approximately horizontal position, whereby an indentation provided in the tubular crucible between the solid original more volatile component and the less volatile component spatially separates these materials, and thereafter vertically turning the crucible whereupon the melt of the compound is permitted to solidify in the vertically positioned crucible.

2. Method according to claim 1, which includes returning the tubular crucible to a horizontal position after crystallization of the melt is completed.

References Cited

UNITED STATES PATENTS

| | | | |
|---|---|---|---|
| 1,189,548 | 7/1916 | Durville | 164—136 |
| 3,152,373 | 10/1964 | Einthoven et al. | |
| 3,209,436 | 10/1965 | Kramp et al. | 164—61 |
| 3,333,625 | 8/1967 | Fromson | 164—136 |
| 2,036,496 | 4/1936 | Randolph | 164—65 |
| 1,897,589 | 2/1933 | Reeve | 164—65 X |
| 2,880,497 | 4/1959 | Hall | 252—500 |
| 3,139,599 | 6/1964 | Mesecke | 338—18 |
| 3,318,669 | 5/1967 | Folberth | 23—315 |

FOREIGN PATENTS 244,260 12/1962 Australia.
997,363 7/1965 Great Britain.

J. SPENCER OVERHOLSER, Primary Examiner
V. RISING, Assistant Examiner

U.S. Cl. X.R.
23—204; 75—135; 164—136, 337